United States Patent [19]
Haendle et al.

[11] Patent Number: 5,444,755
[45] Date of Patent: Aug. 22, 1995

[54] RADIOLOGICAL SYSTEM WITH CONTROL OF THE MODULATION TRANSFER FUNCTION DEPENDENT ON AMBIENT LIGHT

[75] Inventors: Joerg Haendle; Heinz Horbaschek, both of Erlangen, Germany

[73] Assignee: Siemens Aktiengesellschaft, Munich, Germany

[21] Appl. No.: 262,693

[22] Filed: Jun. 20, 1994

[30] Foreign Application Priority Data
Jun. 23, 1993 [DE] Germany .......... 43 20 877.0

[51] Int. Cl.⁶ .................................. H05G 1/64
[52] U.S. Cl. .................... 378/98; 378/98.7; 348/227; 348/602
[58] Field of Search ............ 348/227, 602, 625, 607; 378/98, 98.2, 98.3, 98.7, 96

[56] References Cited
U.S. PATENT DOCUMENTS
4,589,022  5/1986  Prince et al. .......... 348/602
5,091,925  2/1992  Haendle et al. ........ 378/98.2

FOREIGN PATENT DOCUMENTS
4100262  7/1991  Germany .

Primary Examiner—David P. Porta
Assistant Examiner—Don Wong
Attorney, Agent, or Firm—Hill, Steadman & Simpson

[57] ABSTRACT

A radiological system, wherein x-ray images (radiation images) are produced and are converted, through a video chain, for display as a video image, the system having a modulation transfer function, has the capability of influencing the modulation transfer function dependent on ambient light which is present at the display. To that end, a control unit is provided which provides two-dimensional control of the modulation transfer function dependent on illumination which is present in the environment of the display. The control is effected by means of a two-dimensional spatial frequency filter.

13 Claims, 2 Drawing Sheets

RADIOLOGICAL SYSTEM WITH CONTROL OF THE MODULATION TRANSFER FUNCTION DEPENDENT ON AMBIENT LIGHT

BACKGROUND OF THE INVENTION

1. Field of the Invention

The present invention is directed to a radiological system wherein x-ray images (radiation images) can be produced and displayed on a display monitor, the radiation images being converted into video images through a video chain which exhibits a predetermined modulation transfer function.

2. Description of the Prior Art

As is known, the function of an imaging system (video chain) in the context of a radiological system is to translate the modulation of the x-ray beam into a visible image and to reproduce this modulation faithfully, so that the features of the imaged object are apparent. The ability of an imaging system to fulfill this responsibility is known as the modulation transfer function. The modulation transfer function of the composite system is the product of the respective modulation transfer functions of the individual components of the system.

In radiological systems of the type described above, the influence of the ambient luminosity in the environment of the screen of the video monitor, for example, a television monitor, can be reduced by the use of anti-reflective coatings on the picture screen surface of the monitor, by coloring the monitor glass, and/or by controlling the contrast or brightness dependent on the ambient luminosity. These measures enable a high ambient luminosity to be present at the picture screen, however, this may have a disadvantageous influence on the modulation transfer function at the picture screen. High changes in illumination can also disadvantageously affect the modulation transfer function at the picture screen. As noted above, the modulation transfer function in radiology is a measure, among other things, of the extent to which contrasts in the radiation image (i.e., the invisible radiation image produced by x-rays penetrating a subject) are transferred into the visual image, these contrasts being dependent, in part, on the size of the details in the radiation image.

SUMMARY OF THE INVENTION

It is an object of the present invention, in a radiological system of the type described at the outset, to substantially compensate for the influence of the modulation transfer function on the video image display due to high ambient illumination in the environment of the display, particularly due to changes in the ambient illumination.

The above object is achieved in accordance with the principles of the present invention in a radiological system wherein x-ray images are generated and are supplied,m through a video chain exhibiting at least one predetermined modulation transfer function, to a video display, the video chain including means for two-dimensionally controlling the modulation transfer function dependent on illumination which is present in the environment of the video display, the two-dimensional control being accomplished by means of a two-dimensional spatial frequency filter.

As a result of the use of a two-dimensional spatial frequency filter, the image transmission can be two-dimensionally influenced dependent on the ambient illumination, i.e., in the direction of the lines comprising the video image and in a direction perpendicular to the lines. The two-dimensional control of the modulation transfer function dependent on the ambient illumination by employing a two-dimensional spatial frequency filter differs from known techniques such as, for example, adjusting the contrast, which does not influence the modulation transfer function. The use of a two-dimensional spatial frequency filter additionally enables a change, (for example, a boost) to be made perpendicularly to the line direction dependent on the ambient illumination by changing the frequency response (for example, frequency response boost) in the video amplifier. Given intense illuminations, and changes in illumination, the effect thereof on the modulation transfer function is substantially compensated.

Two-dimensional spatial frequency filters can be realized using digital semiconductor image memories. Analog two-dimensional spatial frequency filtering, for example using a vidicon, can be realized as an image memory as well. Known two-dimensional spatial frequency filters are employed for boosting detail contrast in fluoroscopic images an in digital x-ray images.

The invention is based on the perception that the modulation transfer function of the image transmission, up to and including the eye of the observer, is negatively influenced by the ambient luminosity, for example by stray light, the detail contrast reproduction of a monitor image being diminished with increasing ambient luminance. This reduction of the modulation transfer function is compensated in accordance with the invention by the aforementioned two-dimensional spatial frequency filtering, which permits the size of the change, for example, a boost, of the modulation transfer function to be two-dimensionally controlled by the intensity of the ambient luminance.

In one embodiment of the invention, the video chain (image signal path) branches at node into a first branch and a second branch. One of these branches contains the two-dimensional spatial frequency filter, and each branch is connected to a mixer circuit which can be controlled dependent on the illumination which is present in the environment of the image display. In this embodiment, the compensation of the modulation transfer function dependent on the ambient luminance is achieved by controlling the mixing circuit, which is supplied with a two-dimensionally modified, for example a two-dimensionally boosted, signal via one branch and which is supplied with an unmodified signal via the other branch. By controlling the mixing ratio of these two different signals dependent on the ambient illumination, a compensation of the influence of the ambient illumination on the modulation transfer function is achieved.

In a modification of the invention, the two-dimensional spatial frequency filter itself is controlled dependent on the ambient illumination, thereby resulting in a compensation of the aforementioned influence of the ambient illumination.

In a further embodiment, the control of the mixer and the control of the two-dimensional spatial frequency filter dependent on the ambient illumination are combined in a single radiological system. This permits a particularly wide-range, two-dimensional variation of the modulation transfer function to be achieved dependent on the ambient illumination.

DESCRIPTION OF THE PREFERRED EMBODIMENTS

Figure 1:
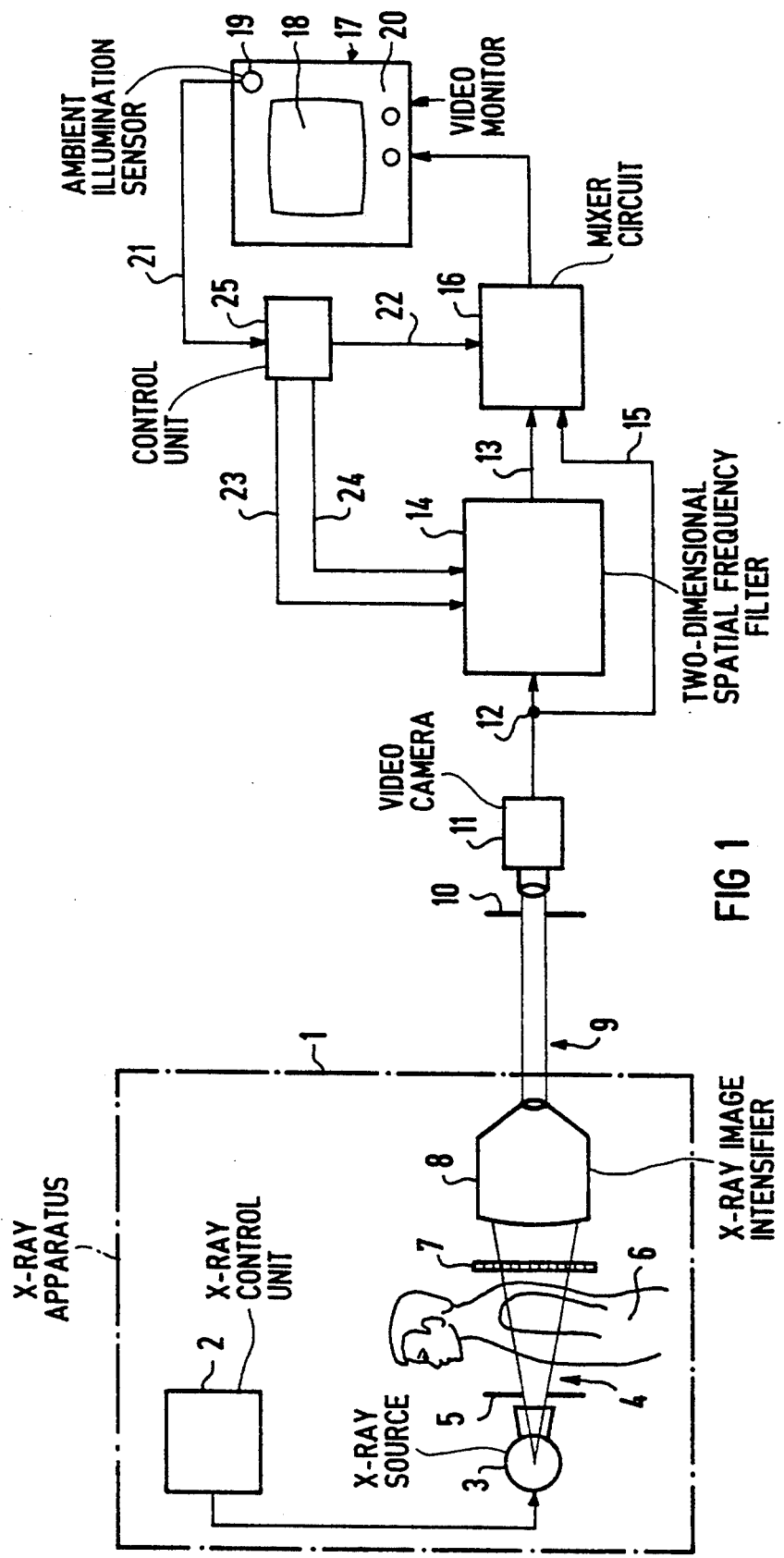
FIG. 1 is a schematic block diagram of a radiological system constructed and operating in accordance with the principles of the present invention.

The radiological system of the invention shown in FIG. 1 has an x-ray apparatus 1. The x-ray apparatus 1 includes at least one x-ray control unit 2, an x-ray tube 3 which emits x-rays 4 which are gated by a diaphragm 5 and which penetrate an examination subject 6. The attenuated radiation emerging from the subject 6 passes through a grid 7 and is incident on the input screen of an x-ray image intensifier 8. The optical beam 9 emerging from the output screen of the x-ray image intensifier 8 passes through a television iris 10 to a video camera 11.

The video camera 11 constitutes the beginning of a video chain (image signal path), which includes a two-dimensional spatial frequency filter 14, a mixer circuit 16, and a video monitor 17. The video signal output of the video camera 11 proceeds to a node 12, wherein it is divided into a first branch 13 containing the two-dimensional spatial frequency filter 14, and into a second branch 15 which proceeds directly to the mixer circuit 16. The output of the mixer circuit 16 is connected to the input of the video monitor 17, which has a picture screen 18. The picture screen 18 of the video monitor 17 forms the end of the video chain.

In the exemplary embodiment shown in FIG. 1, the video monitor 17 has a sensor 19 which generates a sensor signal dependent on the illumination, for example, dependent on the intensity of the illumination, which is present in the environment of the video monitor 17. The sensor signal is employed for controlling at least one modulation transfer function in the video chain. For that purpose, the sensor 19 is arranged at the video monitor 17 on a surface 20, such as a housing surface, which also contains the picture screen 18 on which the radiation images are visually reproduced.

The sensor signal from the sensor 19 is supplied via respective electrical lines 21 and 22 to the mixer circuit 16. In the embodiment shown in FIG. 1, the mixer circuit 16 is directly supplied, via the branch 15, with the video signals corresponding to the radiation image picked-up by the video camera 11, and is supplied with a separate signal via the branch 13 which is two-dimensionally varied in terms of its modulation transfer function by the two-dimensional spatial frequency filter 14. Dependent on the ambient illumination, consequently, the mixing ratio of the signals in the two branches 13 and 15 is varied so that a wide-range compensation is achieved dependent on the ambient illumination which is present in the environment of the video monitor 17.

The sensor signal from the sensor 19 can be supplied directly to the mixer circuit 16 via lines 21 and 22, or can be supplied to the mixer circuit 16 via a control unit 25. The control unit 25 has output lines 23 and 24 leading to the two-dimensional spatial frequency filter 14 for respectively controlling the two dimensions thereof dependent on the sensor signal. The control unit 25 can be optionally operated so that only the mixer circuit 16 is controlled dependent on the sensor signal, or so that only the spatial frequency filter 14 is controlled dependent on the sensor signal, or so that both the mixer circuit 16 and the spatial frequency filter 14 are controlled, in combination, dependent on the sensor signal. The control circuit 25 matches the sensor signal from the sensor 19 to the control functions of the two-dimensional spatial frequency filter 14 and/or the mixer circuit 16.

Figure 2:
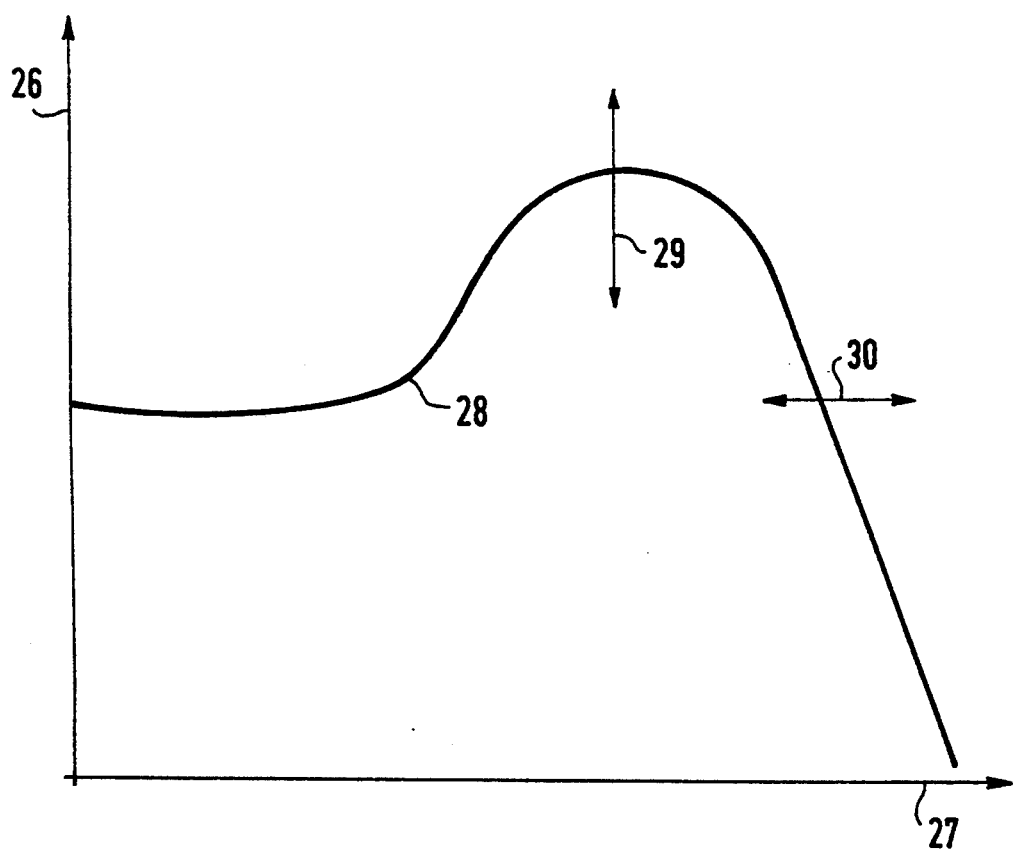
FIG. 2 shows a curve of a modulation transfer function dependent on the spatial frequency, for explaining the operation of the radiological system of FIG. 1.

The modulation transfer function is shown on the ordinate 26 in FIG. 2 dependent on the spatial frequency entered along the abscissa 27. The exemplary curve 28 shows a typical modulation transfer function for a two-dimensional spatial frequency filter fashioned as a high-pass filter. The two-dimensional spatial frequency filter 14 may alternatively be fashioned as a digital filter, or as an analog filter. The double arrow 29 symbolizes the rise and fall of the curve 28 of the modulation transfer function dependent on the ambient illumination. The variation of the limit frequency of the modulation transfer function dependent on the measured ambient luminance, for example dependent on the sensor signal from the sensor 19, is symbolized by the further double arrow 30.

In the manner described in connection with FIG. 1, both the transmission curve of the two-dimensional spatial frequency filter 14 and the limit frequency thereof can be automatically varied (controlled) dependent on the ambient luminance, by the respective lines 23 and 24.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiological system comprising:
   x-ray examination means for producing an x-ray image of an examination subject;
   means for converting said x-ray image into an optical image;
   a video chain exhibiting a modulation transfer function and including means for generating a video signal from said optical image, a video monitor, on which said image is displayed, disposed in an environment having ambient illumination, and means employing a two-dimensional spatial frequency filter for modifying said modulation transfer function two-dimensionally dependent on said ambient illumination.

2. A radiological system as claimed in claim 1 wherein said video chain includes a mixer circuit, and first and second branches to which said video signal is supplied, said first branch feeding directly to said mixer circuit and said second branch containing said two-dimensional spatial frequency filter, and said mixer circuit having a mixing ratio settable dependent on said ambient illumination for controlling mixing of the video signal supplied directly by said first branch and the video signal supplied through said two-dimensional spatial frequency filter in said second branch.

3. A radiological system as claimed in claim 1 further comprising sensor means for generating a sensor signal dependent on said ambient illumination, said sensor signal being supplied to said means for modifying said modulation transfer function for controlling modification of said modulation transfer function.

4. A radiological system as claimed in claim 3 wherein said video monitor has a surface containing a picture screen on which said displayable image is reproduced, and wherein said sensor means is disposed at said surface.

5. A radiological system as claimed in claim 1 wherein said two-dimensional spatial frequency filter exhibits a transmission curve controllable dependent on said ambient illumination.

6. A radiological system as claimed in claim 1 wherein said two-dimensional spatial frequency filter exhibits a limit frequency controllable dependent on said ambient illumination.

7. A radiological system as claimed in claim 1 wherein said two-dimensional spatial frequency filter exhibits a transmission curve and a limit frequency both of which are controllable simultaneously dependent on said ambient illumination.

8. A radiological system as claimed in claim 1 wherein said two-dimensional spatial frequency filter comprises a high-pass filter.

9. A radiological system as claimed in claim 1 wherein said two-dimensional spatial frequency filter comprises a digital filter.

10. A radiological system as claimed in claim 1 wherein said two-dimensional spatial frequency filter comprises an analog filter.

11. A radiological system comprising:
means for producing a radiation image of an examination subject;
means for converting said radiation image into an optical image;
a video chain exhibiting a modulation transfer function and including means for converting said optical image into a video signal, a video monitor for displaying a video image obtained from said video signal, said video monitor being disposed in an environment having ambient illumination, means for generating a control signal dependent on said ambient illumination, and a two-dimensionally adjustable spatial frequency filter, to which said video signal is supplied, and having an output supplied to said video monitor, said control signal being supplied to said spatial frequency filter for two-dimensionally controlling said modulation transfer function dependent on said ambient illumination.

12. A radiological system comprising:
means for generating a radiation image of an examination subject;
means for converting said radiation image into an optical image; and
a video chain exhibiting a modulation transfer function and including converter means for converting said optical image into a video signal, a mixer circuit having a mixing ratio, a first branch, connected between said converter means and said mixer circuit, said first branch containing a two-dimensional spatial frequency filter, a second branch connected directly between said converter means and said mixer circuit, a video monitor for displaying an image corresponding to said optical image obtained from said video signal, said monitor being disposed in an environment having ambient illumination, and means for generating a control signal dependent on said ambient illumination, said mixer circuit being supplied with said control signal and varying said mixing ratio dependent on said control signal to mix the respective signals of said first and second branches in different ratios for modifying said modulation transfer function dependent on said ambient illumination.

13. A radiological system comprising:
means for generating a radiation image of an examination subject;
means for converting said radiation image into an optical image; and
a video chain exhibiting a modulation transfer function and including converter means for converting said optical image into a video signal, a mixer circuit having a mixing ratio, a first branch, connected between said converter means and said mixer circuit, said first branch containing a two-dimensionally adjustable spatial frequency filter, a second branch connected directly between said converter means and said mixer circuit, a video monitor for displaying an image corresponding to said optical image obtained from said video signal, said monitor being disposed in an environment having ambient illumination, means for generating a control signal dependent on said ambient illumination, and control means, supplied with said control signal, for controlling said mixer circuit and for two-dimensionally adjusting said spatial frequency filter in combination for controlling said mixing ratio in said mixer circuit of the respective signals on said first and second branches and for controlling two-dimensional spatial frequency filtering which takes place in said spatial frequency filter dependent on said ambient illumination to modify said modulation transfer function dependent on said ambient illumination.

* * * * *